United States Patent [19]

Jutamulia

[11] Patent Number: 5,647,032
[45] Date of Patent: Jul. 8, 1997

[54] INTERFEROMETERS FOR MEASURING COHERENCE LENGTH AND HIGH-SPEED SWITCHING OF LASER LIGHT

[75] Inventor: Suganda Jutamulia, Fremont, Calif.

[73] Assignee: Kowa Company, Ltd., Tokyo, Japan

[21] Appl. No.: 519,143

[22] Filed: Aug. 24, 1995

[51] Int. Cl.$^6$ .............................. G02B 6/12; G01B 9/02
[52] U.S. Cl. ................... 385/14; 385/15; 385/16; 385/39; 385/40; 385/130; 385/132; 356/345; 356/350; 356/346
[58] Field of Search ................... 385/15, 14, 27, 385/28, 39, 132, 40, 47, 129, 130, 16; 356/345, 350, 346; 250/227.19

[56] References Cited

U.S. PATENT DOCUMENTS

| | | | |
|---|---|---|---|
| 3,597,088 | 8/1971 | Catherin | 356/350 X |
| 3,927,946 | 12/1975 | McClure | 356/350 X |
| 4,480,915 | 11/1984 | Arditty et al. | 356/350 |
| 4,521,110 | 6/1985 | Roberts et al. | 356/350 |
| 4,556,321 | 12/1985 | Schiffner | 356/350 |
| 5,090,795 | 2/1992 | O'Meara et al. | 359/240 |
| 5,133,598 | 7/1992 | Badeau | 356/345 |
| 5,224,200 | 6/1993 | Rasmussen et al. | 385/146 |
| 5,239,364 | 8/1993 | Matsuzaki | 356/360 |
| 5,268,738 | 12/1993 | Baney et al. | 356/345 |
| 5,270,790 | 12/1993 | Matsumura | 356/346 |
| 5,291,268 | 3/1994 | Tank et al. | 356/346 |
| 5,341,207 | 8/1994 | Tank et al. | 356/346 |
| 5,351,325 | 9/1994 | Miller et al. | 385/42 |

OTHER PUBLICATIONS

F.T.S. Yu and S. Jutamulia, "Optical Signal Processing, Computing, and Neural Networks," Wiley, New York, 1992, pp. 9–10 No Month.

G.O. Reynolds et al. "The New Physical Optics Notebook: Tutorials in Fourier Optics, " SPIE, Bellingham, Washington, 1989, pp. 248–255 No Month.

B.E.A. Saleh and M.C. Teich, "Fundamentals of Photonics, " Wiley, New York, 1991, pp. 63–67, 361–362, 837–838 No Month.

*Primary Examiner*—Brian Healy

[57] ABSTRACT

To measure the coherence length of light, an incident beam (20) is caused to interfere with replicas of itself after having variable delays. Variable delays are generated by passing a beam (40) that is a part of the incident beam (20) around a loop (46). The beam partially leaves the loop (46) at each cycle and partially continues looping. A beam (44) with multiple delays leaving from the loop (46) is caused to interfere with a beam (56) that is another part of the incident beam (20) without delay, to create an output beam (60). The intensity of output beam (60) is affected by multiple delays caused by the loop (46), and depends on the coherence length of the incident beam (20). Therefore, the coherence length of the incident beam (20) can be obtained by detecting the intensity of output beam (60). When the coherence length of light is sufficiently large, by setting the resultant intensity of output beam (60) to be zero, the interferometer can also be used for high speed switching of laser light, based on a transient phenomenon.

22 Claims, 4 Drawing Sheets

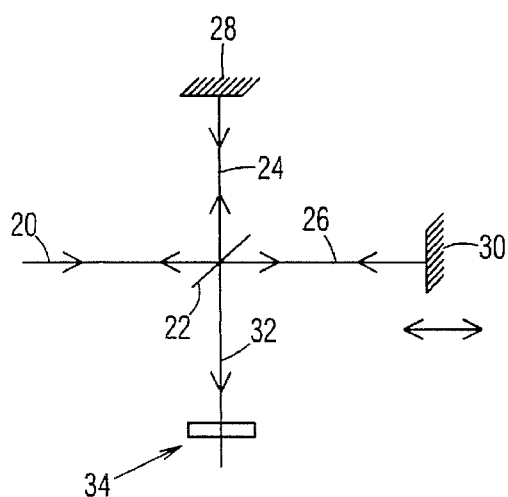
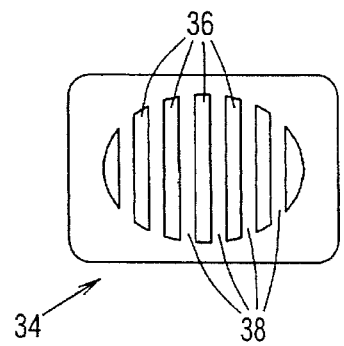
Fig. 1A
PRIOR ART
Fig. 1B
PRIOR ART
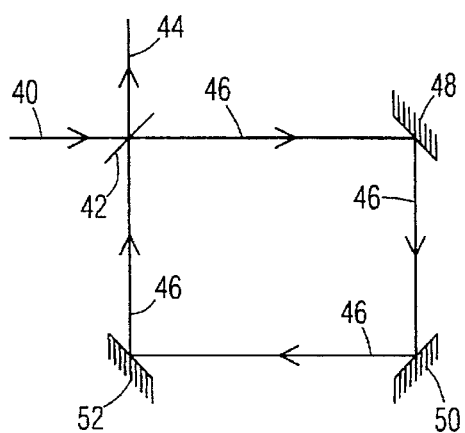
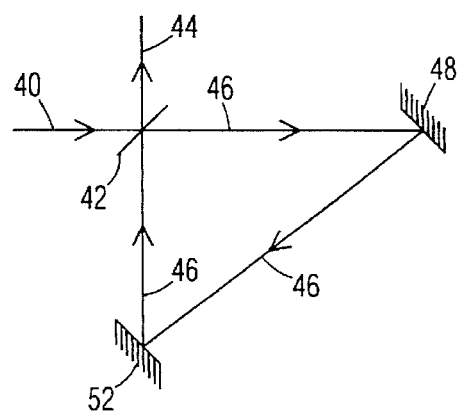
Fig. 2A
Fig. 2B

INTERFEROMETERS FOR MEASURING COHERENCE LENGTH AND HIGH-SPEED SWITCHING OF LASER LIGHT

BACKGROUND—FIELD OF INVENTION

This invention relates to interferometers (i.e., optical systems for combining two light beams), specifically to interferometers that are able to measure an important parameter (coherence length) of laser light and to switch laser light at high speed.

BACKGROUND—DESCRIPTION OF PRIOR ART

Interference is a phenomenon that two or more light beams interact, resulting in an interference pattern that usually has bright and dark areas. When two light beams interfere by combination or superposition, this may result in a dark output (destructive interference), i.e., the two beams cancel each other. Of course, a bright output (constructive interference) may result as well.

Depending upon the phase difference between two beams, the interference can be constructive or destructive. If the phase difference does not change in time, the two beams are called mutually coherent. If the phase difference randomly fluctuates in time, the two beams are called mutually incoherent. Insofar as known, light interferes only when light beams are mutually coherent. In other words, the combination of two mutually incoherent beams will never produce a resultant intensity that is lower than any original beam's intensity.

When light from a laser is combined with a replica of itself delayed by a time t, an interference effect can be observed until the time delay t reaches a limit of time delay, τ, which is called coherence time. When t is larger than τ, the interference effect disappears. The product of τ and the speed of light, c, is called the coherence length of the laser.

Light emitted from a laser is coherent only within its coherence length. Therefore, the coherence length of a laser is very important in the design of optical equipment that is based on interference of light. Two light beams will not interfere if they are separated by a distance larger than the coherence length, even though they come from the same laser.

The measurement of coherence length using a Michelson interferometer, which will be explained in the next paragraph, is described in literature, for example, in "Optical Signal Processing, Computing, and Neural Networks," (Wiley, 1992) by F. T. S. Yu and S. Jutamulia, pp. 9–10; in "The New Physical Optics Notebook: Tutorials in Fourier Optics," (Optical Engineering Press, 1989) by G. O. Reynolds, J. B. Develis, G. B. Parrent, Jr., and B. J. Thompson, pp. 248–255; and in "Fundamentals of Photonics," (Wiley, 1991 by B. E. A. Saleh and M. C. Teich, pp. 361–362.

The Michelson interferometer is schematically shown in prior-art FIG. 1A. An incident laser beam 20 is divided by a beam splitter 22 (which can be a half-silvered mirror) into two beams 24 and 26, which travel in orthogonal directions (up and right). Beams 24 and 26 are then reflected back (down and left) by mirrors 28 and 30, respectively. Reflected beams 24 and 26 are combined by beam splitter 22 as a downward output beam 32.

A wavefront is the surface over which light is in the same phase with each other. For a light beam in the Michelson interferometer, the wavefront of the beam is simply a plane perpendicular to the beam.

The intensity of the output beam 32 can be observed by placing a screen 34 perpendicular to it. If the wavefronts of beams 24 and 26 are parallel, the intensity of output beam 32 observed on screen 34 is uniform. However, because beams 24 and 26 are reflected by beam splitter 22 and mirrors 28 and 30, the wavefronts of beams 24 and 26 usually form an angle. Consequently, the intensity of output beam 32 shows a pattern of bright-and-dark interference fringes generated by beams 24 and 26 as illustrated in prior-art FIG. 1B. Bright fringes and dark fringes are indicated by 36 and 38, respectively.

To measure the coherence length of the incident laser beam, one first adjusts the distances between beam splitter 22 and mirror 28, and beam splitter 22 and mirror 30, so beams 24 and 26 have the same optical path length. In other words, beams 24 and 26 travel the same length. The wavefronts of beams 24 and 26 are made to be non-parallel so interference fringes of bright and dark lines can be observed by placing screen 34 perpendicular to output beam 32 as illustrated in FIG. 1B.

When one of the mirrors, for example, mirror 30, is slightly moved, the optical path difference between beams 24 and 26 increases, because they do not travel the same length now. Also, the intensity of the bright fringes decreases while the intensity of the dark fringes increases. Finally, interference fringes disappear from screen 34, i.e., the intensity of the bright fringes is the same as the intensity of the dark fringes when the difference of the optical path lengths of beams 24 and 26 is larger than the coherence length of light.

It is clear that to measure the coherence length of light using the Michelson interferometer, a mirror must be moved. The disadvantages of this classic technique include:

(a) the coherence length cannot be measured in real time, i.e., instantaneously or directly;

(b) both the maximum and minimum intensities of the resultant fringes must be measured;

(c) any movement of the mirror may change the preset alignment; and (d) it is difficult to reset accurately the position of the moving mirror to its original position.

A number of attempts to improve the Michelson interferometer have been made. These attempts include methods recently disclosed in U.S. Pat. Nos. 5,341,207 and 5,291,268 to Tank et al. (1994), U.S. Pat. No. 5,270,790 to Matsumura (1993), and U.S. Pat. No. 5,133,598 to Badeau (1992). All of these patents disclose methods for improving control over the moving parts in a Michelson interferometer. Although good precision can be obtained, the improved parts are usually expensive and still bulky. Thus, the interferometer is still based on a moving mirror or mirrors to provide variable optical path differences or delays.

To summarize, the remaining disadvantages of the prior-art Michelson interferometer for measuring coherence length of laser light are as follows:

(a) The coherence length cannot be measured in real time, because a number of interference patterns must be analyzed for different positions of the moving mirror.

(b) Both the maximum and minimum intensities of the resultant fringes must be measured for every position of the moving mirror.

(c) Expensive and bulky parts must be used to maintain the alignment of interferometer when the mirror is moved.

(d) Expensive and bulky parts must be used to reset accurately the position of the moving mirror to its original position.

(e) The motion of mechanical parts generates vibration.

(f) This requires that the measurement must be further delayed until the vibration is negligible.

OBJECTS AND ADVANTAGES

Accordingly, several objects and advantages of the present invention are:

(a) to provide an improved way to measure the coherence length of laser light in real time;

(b) to eliminate repeated measurements of maximum and minimum intensities of the resultant fringes for every position of a mirror used in an interferometer;

(c) to eliminate the requirement of expensive and bulky parts to maintain the alignment of an interferometer when its mirror is moved;

(d) to eliminate the requirement of expensive and bulky parts to reset accurately the position of the moving mirror in an interferometer to its original position;

(e) to eliminate mechanical parts that generate vibration in an interferometer; and (f) to avoid the need to delay measurements of resultant intensities in an interferometer.

Note that advantages (b), (c), (d), (e) and (f) are consequences of the fact that the mirror is no longer moved.

Another object and advantage is that laser light can be switched at high speed without mechanical means and without electric or additional optical power.

Further objects and advantages are to provide a versatile interferometer which is simple to use and maintain and which is inexpensive to manufacture.

Still further objects and advantages will become apparent from a consideration of the ensuing description and drawings.

DRAWING FIGURES

In the drawings, closely related figures have the same number but different alphabetic suffixes.

FIG. 1A shows a prior-art Michelson interferometer with at least one moving mirror.

FIG 1B shows an output of a prior-art Michelson interferometer observed on a screen.

FIGS. 2A and 2B illustrate the principle of an interferometer in accordance with the invention.

Figure 3:
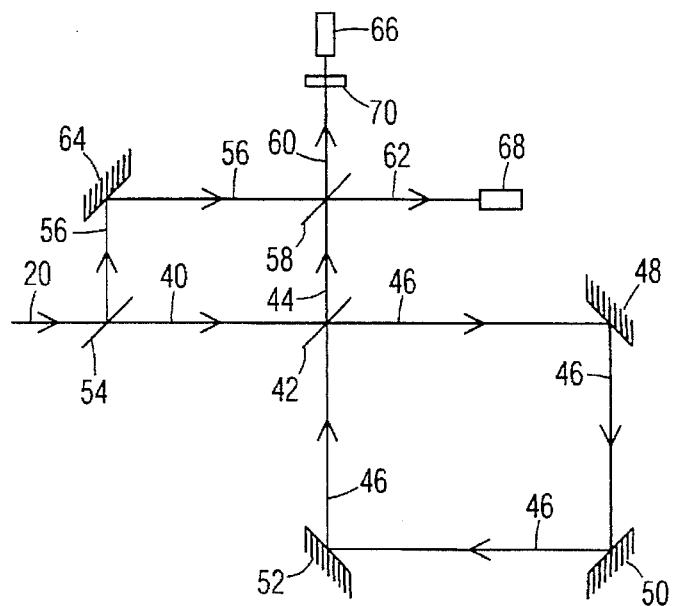
FIG. 3 shows a combination of a Mach-Zehnder interferometer and the interferometer shown in FIG. 2A in accordance with the invention.

| Reference Numerals In Drawings | |
|---|---|
| 20 input beam | 22 beam splitter |
| 24 beam from beam splitter 22 | 26 beam from beam splitter 22 |
| 28 mirror | 30 mirror |
| 32 output beam | 34 screen |
| 36 bright interference fringe | 38 dark interference fringe |
| 40 beam coming to beam splitter 42 | 42 beam splitter |
| 44 beam leaving beam splitter 42 | 46 looping beam |
| 48 mirror | 50 mirror |
| 52 mirror | 54 beam splitter |
| 56 beam from beam splitter 54 | 58 beam splitter |
| 60 output beam | 62 output beam |
| 64 mirror | 66 detector |
| 68 detector | 70 shutter |
| 72 waveguide | 74 waveguide |
| 76 substrate | 78, 78A, 78B, 78C waveguide coupler |
| 80 beam splitter | 82 input beam |
| 84 input beam | 86 output beam |
| 88 output beam | 90 looping waveguide |
| 92 electrodes | 94 optical fiber |
| 96 beam splitter | 98 beam coming to beam splitter 22 |
| 100 beam reflected by beam splitter 96 | 102 half-silvered mirror |
| 104 equivalent looping beam | 106 output beam reflected by beam splitter 96 |

SUMMARY

In accordance with the invention, a beam is caused to interfere with replicas of itself after having delays that are multiples of a value. The multiple delays are produced by passing the beam around a loop. The coherence length of laser light is measured by detecting only two output intensities produced by the multiple interference.

FIGS. 2A and 2B—DESCRIPTION

FIGS. 2A and 2B illustrate the principle of the present invention.

An incoming light beam 40 (FIG. 2A) is divided by a beam splitter 42 into an upward beam 44 (reflected by beam splitter 42) and a right beam 46 (transmitted through beam splitter 42). Beam splitter 42 may divide the energy of beam 40 into beams 44 and 46 by any ratio. For the sake of simplicity, assume that the energy is equally divided into beams 44 and 46. Therefore, the intensity of each of beams 44 and 46 is half the intensity of beam 40. Since intensity is the square of amplitude (intensity=|amplitude|$^2$), the amplitudes of beams 44 and 46 are $1/\sqrt{2}$ of the amplitude of beam 40. Assuming that the amplitude of beam 40 is unity, the amplitudes of beam 44 and 46 are $1/\sqrt{2}$.

Beam 46 is then returned to beam splitter 42 by a rectangular optical path that is formed by a set of three mirrors, 48, 50, and 52, in free space.

Alternatively, a triangular optical path formed by a set of two mirrors, 48 and 52, can be used to return beam 46 as shown in FIG. 2B.

Furthermore, an optical fiber (not shown) as well as an optical waveguide (not shown) can also be used to form the optical path for returning beam 46 to beam splitter 42.

Beam 46, which returns to beam splitter 42, is partially transmitted through beam splitter 42 and combined with beam 44, and is also partially reflected by beam splitter 42 and combined with itself.

The portion of beam 46 reflected by beam splitter 42, and the portion of beam 46, which passes through beam splitter 42 from beam 40, will interfere and form a subsequent beam 46 along the same path and coincident with original beam 46. Thus, the optical path that returns beam 46 to beam splitter 42 forms a closed loop. Beam 46 thus cycles around the loop.

The length of the loop of beam 46 in FIGS. 2A and 2B is adjusted according to the central wavelength of the incident light to produce constructive interference in beam 46. According to conservation of energy, destructive interference will concurrently occur in beam 44. Assuming that the amplitude of beam 40 is unity, when beam 46 is in the first cycle of looping, the amplitudes of beams 44 and 46 are $1/\sqrt{2}$.

In the interferometer, the wavefronts of interfering beams are made parallel. Due to constructive interference, when beam 46 is in the second cycle of looping, the amplitude of beam 46 is the summation of its portion from beam 40 ($1/\sqrt{2} \times 1$) and its portion from the first cycle of looping ($1/\sqrt{2} \times 1/\sqrt{2}$). Thus, it is:

$$1/\sqrt{2} + 1/\sqrt{2}(1/\sqrt{2}).$$

At the same time, due to destructive interference, the amplitude of the beam 44 is:

$$1/\sqrt{2} - 1/\sqrt{2}(1/\sqrt{2}).$$

When the beam 46 is in the third cycle, the amplitude of beam 46 is the summation of its portion from beam 40 ($1/\sqrt{2} \times 1$) and its portion from the second cycle of looping ($1/\sqrt{2} \times [1/\sqrt{2} + 1/\sqrt{2}(1/\sqrt{2})]$). Thus, it is:

$$1/\sqrt{2} + 1/\sqrt{2}\,[1/\sqrt{2} + 1/\sqrt{2}(1/\sqrt{2})].$$

Correspondingly, the amplitude of beam 44 is:

$$1/\sqrt{2} - 1/\sqrt{2}[1/\sqrt{2} + 1/\sqrt{2}(1/\sqrt{2})].$$

Similarly, in the fourth cycle, the amplitude of beam 46 is the summation of its portion from beam 40 ($1/\sqrt{2} \times 1$) and its portion from the third cycle of looping ($1/\sqrt{2} \times \{1/\sqrt{2} + 1/\sqrt{2}\,[1/\sqrt{2} + 1/\sqrt{2}(1/\sqrt{2})]\}$). Thus, it is:

$$1/\sqrt{2} + 1/\sqrt{2}\,\{1/\sqrt{2} + 1/\sqrt{2}\,[1/\sqrt{2} + 1/\sqrt{2}(1/\sqrt{2})]\}.$$

The amplitude of beam 44 is:

$$1/\sqrt{2} - 1/\sqrt{2}\{1/\sqrt{2} + 1/\sqrt{2}[1/\sqrt{2} + 1/\sqrt{2}(1/\sqrt{2})]\},$$

and so forth.

It can be formulated that when beam 46 is in the N-th cycle, the amplitude of beam 46 is as follows:

$$A_{B46} = 1/\sqrt{2} + (1/\sqrt{2})^2 + (1/\sqrt{2})^3 + \ldots + (1/\sqrt{2})^N. \quad (1)$$

Correspondingly, the amplitude of beam 44 is:

$$A_{B44} = 1/\sqrt{2} - (1/\sqrt{2})^2 - (1/\sqrt{2})^3 - \ldots - (1/\sqrt{2})^N. \quad (2)$$

When N approaches infinity, Eqs. (1) and (2) becomes $$A_{B46} = 2.41, \quad (3)$$

and $$A_{B44} = -1. \quad (4)$$

Remember that the amplitude of incident beam 40 is unity ($A_{B40} = 1$). It is apparent that at the theoretical equilibrium state (when $N \to \infty$), the energy coming into the interferometer is 1 ($|A_{B40}|^2 = 1$); and the energy leaving the interferometer, that is $|A_{B44}|^2$, is also 1, although the phase is changed by 180°.

There are two interesting phenomena, namely, at the equilibrium state the energy inside the interferometer is $|2.41|^2 = 5.81$ which is larger than 1; and the output intensity and amplitude are time functions.

The most common types of interferometers are the Michelson, the Mach-Zehnder, and the Sagnac interferometers. See, for example, "Fundamentals of Photonics," op. cit. pp. 63–67. In contrast to the present interferometer, these provide temporally constant output intensity of interference.

FIG. 3—DESCRIPTION

FIG. 3 shows the principle of coherence length measurement and laser light switching according to the invention.
Measurement of Coherence Length A Mach-Zehnder interferometer is a common interferometer that has a beam splitter for dividing an input beam into two beams, two mirrors for directing two divided beams, and another beam splitter for combining the divided beams as two output beams. See, for example, "Fundamentals of Photonics," op. cit. pp. 63–67.

For illustration, the basic interferometer described in FIG. 2A is combined with a Mach-Zehnder interferometer comprising beam splitters 54, 42, 58, and a mirror 64. For the sake of simplicity in the calculation, assume that the incoming light intensity of beam 20 is 2 and its amplitude is $\sqrt{2}$. Incoming beam 20 is divided into beams 56 and 40 by beam splitter 54 with any ratio. For simplicity, we again consider that the energy is equally divided and therefore the amplitudes of beams 56 and 40 are $\sqrt{2}/\sqrt{2} = 1$. The amplitude of beam 44 in FIG. 3 can still be expressed by Eq. (2).

After beam 56 is reflected by mirror 64, beam splitter 58 combines beams 56 and 44 as output beams 60 and 62.

The optical path length of beam 56 and the total optical path length of beams 40 and 44 in the Mach-Zehnder interferometer is set to be equal to produce constructive interference in beam 62. Thus destructive interference occurs in beam 60, independent of the wavelength of light. The intensities of output beams 60 and 62 are detected by detectors 66 and 68, respectively. Detectors 66 and 68 are preferably inexpensive photodiodes. In the measurement of coherence length, shutter 70 is removed from the interferometer shown in FIG. 3.

If the coherence length is infinitely long, the intensity of output beam 60 detected by detector 66 will be zero at the equilibrium state. If the coherence length is finite, the detected intensity will not be zero. The detected intensity of beam 60 is related to the coherence length of light.

We start our analysis by assuming that the length of the loop of beam 46 is L. The time for beam 46 to complete a cycle of looping is L/c, where c is the speed of light. The Mach-Zehnder interferometer is symmetric, so beam 56 and part of beam 44 which does not pass the loop of beam 46 will always interfere, regardless of coherence length.

If the coherence length is infinity, the intensity of beam 60 is:

$$\begin{aligned} I(\infty) &= |1/\sqrt{2} + 1/\sqrt{2}\,[1/\sqrt{2} - (1/\sqrt{2})^2 - \\ &\quad (1/\sqrt{2})^3 - \ldots - (1/\sqrt{2})^N]|^2 \\ &= |1/\sqrt{2}\,|1 + [1/\sqrt{2} - (1/\sqrt{2})^2 - \\ &\quad (1/\sqrt{2})^3 - \ldots - (1/\sqrt{2})^N]|^2, \end{aligned} \quad (5)$$

for $N \to \infty$, $$I(\infty)=0. \tag{6}$$

If the coherence length is less than L, beam 46 will not interfere with itself after one cycle of looping, and thus the intensity of beam 60 is:

$$\begin{aligned} I(L) &= |1/\sqrt{2} + 1/\sqrt{2}\ (1/\sqrt{2})|^2 + |1/\sqrt{2}\ (1/\sqrt{2})^2|^2 + \\ &\quad |1/\sqrt{2}\ (1/\sqrt{2})^3|^2 + |1/\sqrt{2}\ (1/\sqrt{2})^4|^2 + \ldots + \\ &\quad |1/\sqrt{2}\ (1/\sqrt{2})^N|^2 \\ &= |1/\sqrt{2} + 1/2|^2 + (1/2)^3 + (1/2)^4 + (1/2)^5 + \ldots + \\ &\quad (1/2)^{N+1} \\ &= |1/\sqrt{2} + 1/2|^2 + 1/2\ [1/4 + 1/8 + 1/16 + \ldots + \\ &\quad (1/2)^N], \end{aligned} \tag{7}$$

for $N \to \infty$, $$\begin{aligned} I(L) &= |1/\sqrt{2} + 1/2|^2 + 1/4 \\ &= 1.71. \end{aligned} \tag{8}$$

Note that the intensity of beam 62 detected by detector 68 will be $|1/\sqrt{2}-\frac{1}{2}|^2+\frac{1}{4}=0.29$. Thus the total energy leaving the Mach-Zehnder interferometer is 2, which equals the incoming energy.

If the coherence length is larger than L and smaller than 2L, beam 46 will still interfere with itself after one cycle of looping but will not interfere after two cycles. The intensity of beam 60 can be approached as:

$$\begin{aligned} I(2L) &= |1/\sqrt{2} + 1/\sqrt{2}\ (1/\sqrt{2}) - 1/\sqrt{2}\ (1/\sqrt{2})^2|^2 + \\ &\quad |1/\sqrt{2}\ (1/\sqrt{2})^3 + 1/\sqrt{2}\ (1/\sqrt{2})^4|^2 + \ldots \end{aligned} \tag{9}$$

Similarly, $$\begin{aligned} I(3L) &= |1/\sqrt{2} + 1/\sqrt{2}\ (1/\sqrt{2}) - 1/\sqrt{2}\ (1/\sqrt{2})^2 - \\ &\quad 1/\sqrt{2}\ (1/\sqrt{2})^3 + |1/\sqrt{2}\ (1/\sqrt{2})^4 + \\ &\quad 1/\sqrt{2}\ (1/\sqrt{2})^5 + 1/\sqrt{2}\ (1/\sqrt{2})^6 |^2 + \ldots, \end{aligned} \tag{10}$$

and so forth. The values of I (2L), I (3L), I (4L), ..., can be calculated numerically. For illustration, I(2L) to I (10L) are given in Table 1.

TABLE 1

Output intensity as a function of coherence length.

| Coherence Length, l | Intensity |
|---|---|
| l < L | I(L) = 1.71 |
| L ≦ l < 2L | I(2L) = 1.39 |
| 2L ≦ l < 3L | I(3L) = 0.77 |
| 3L ≦ l < 4L | I(4L) = 0.42 |
| 4L ≦ l < 5L | I(5L) = 0.22 |
| 5L ≦ l < 6L | I(6L) = 0.10 |
| 6L ≦ l < 7L | I(7L) = 0.04 |
| 7L ≦ l < 8L | I(8L) = 0.02 |
| 8L ≦ l < 9L | I(9L) = 0.01 |
| 9L ≦ l < 10L | I(10L) = 0.007 |
| l → ∞ | I(∞) = 0 |

These values are calculated using only ten terms of the series; these will have errors less than 1%. This also means that after ten cycles, the change in intensity is less than 1%. If the length L of the loop of beam 46 is 30 cm, ten cycles will be completed in $(10\times 30)/(3\times 10^{10})=10^{-8}$ sec, or 10 ns. The denominator ($3\times 10^{10}$) cm/sec is the speed of light. Thus, in practice, the equilibrium state can be achieved by waiting for a short period of time—about 10 ns.

Table 1 is calculated by taking assumption that the intensity of input beam 20 is 2. In the real measurement, the intensity of input beam 20 is possibly not 2. Therefore, the detected intensity of beam 60 must be normalized before Table 1 can be applied. Since the summation of intensities of output beams 60 and 62 is constant, that is, the same with the intensity of input beam 20, the normalized intensity of beam 60 is $$DI_{B60} \times 2/(DI_{B60}+DI_{B62}),$$

where $DI_{B60}$ and $DI_{B62}$ are actually detected intensities of beams 60 and 62, respectively.

In conclusion, the coherence length can be obtained by measuring intensities of output beams 60 and 62 after a delay of 10 ns, which is considered real time, and by referring to Table 1. Note that to get constructive interference in the loop of beam 46, the loop must be tuned according to the central wavelength of laser light.

Mach-Zehnder interferometers have been widely used as wavelength filters in fiber optical communication systems. For example, U.S. Pat. No. 5,351,325 to Miller et al. (1994) discloses a narrow-band filter using Mach-Zehnder interferometer having more than two delay channels. This Mach-Zehnder filter utilizes more than two optical fibers to produce various delays; each fiber produces a delay. Consequently, one must make multiple efforts to tune the fibers. It is complicated and needs more space in construction.

In contrast, the Mach-Zehnder interferometer of the present invention does not use multiple fibers to generate multiple delays. Instead, a looping optical path is used. Thus, only one tuning is required. The system is simpler and needs less space. Although the present interferometer is designed to measure the coherence length and to switch laser light, it is clear that the interferometer can be used as a wavelength filter as well.

Switching of Laser Light

It is now apparent that if the coherence length of light is larger than 10×L, after 10 ns the intensity of beam 60 will drop to practically zero. So, on the other hand, we can use the output beam 60 as a short light pulse, although the incoming light to the Mach-Zehnder interferometer is continuous-wave laser light. In other words, the interferometer can also be applied as a high-speed optical switch for laser light. The interferometer produces a short pulse from a continuous-wave laser beam.

If the coherence length of light is larger than 10×L, when beam 46 is in the first cycle, the intensity of beam 60 is:

$$I(T)=|1/\sqrt{2}+1/\sqrt{2}(1/\sqrt{2})|^2=1.47, \tag{11}$$

when beam 46 is in the second cycle, the intensity is:

$$\begin{aligned} I(2T) &= |1/\sqrt{2} + 1/\sqrt{2}\ (1/\sqrt{2}) - 1/\sqrt{2}\ (1/\sqrt{2})^2|^2 \\ &= 0.73, \end{aligned} \tag{12}$$

when beam 46 is in the third cycle, the intensity is:

$$\begin{aligned} I(3T) &= |1/\sqrt{2} + 1/\sqrt{2}\ (1/\sqrt{2}) - \\ &\quad 1/\sqrt{2}\ (1/\sqrt{2})^2 - 1/\sqrt{2}\ (1/\sqrt{2})^3|^2 \\ &= 0.37, \end{aligned} \tag{13}$$

and so forth. The intensity of output beam 60 corresponding to time is given in Table 2.

TABLE 2

Output intensity as a function of time.

| Time, t | Intensity |
|---|---|
| t < L/c | I(T) = 1.47 |
| L/c ≦ t < 2L/c | I(2T) = 0.73 |
| 2L/c ≦ t < 3L/c | I(3T) = 0.37 |
| 3L/c ≦ t < 4L/c | I(4T) = 0.19 |
| 4L/c ≦ t < 5L/c | I(5T) = 0.09 |
| 5L/c ≦ t < 6L/c | I(6T) = 0.05 |
| 6L/c ≦ t < 7L/c | I(7T) = 0.02 |
| 7L/c ≦ t < 8L/c | I(8T) = 0.01 |
| 8L/c ≦ t < 9L/c | I(9T) = 0.005 |
| 9L/c ≦ t < 10L/c | I(10T) = 0.003 |

It is seen from Table 2 that after ten cycles, the intensity drops to be about 0.2% of the peak intensity. Remember that if length L of the optical path of beam 46 is 30 cm (for which an optical path can be formed, preferably using an optical fiber or alternatively using mirrors in free space), ten cycles will be completed in $(10 \times 30)/(3 \times 10^{10}) = 10^{-8}$ sec, or 10 ns. The denominator ($3 \times 10^{10}$) cm/sec is the speed of light. Thus, after ten cycles (equivalent to 10 ns), the intensity will be approximately 0.2% of the peak intensity. It means that we have a 10 nanosecond optical switch, i.e., when continuous-wave laser light is applied, a 10 ns pulse will come out. In fact, the half-maximum pulse-width is only 2 ns as shown in Table 2.

If L is 3 cm (for which an optical path can be formed using a waveguide based on integrated optic technology), then we will have a 1 nanosecond optical switch, and the half-maximum pulse-width reduces to 200 ps.

For an optical switch application, detectors 66 and 68 are removed from the interferometer shown in FIG. 3. However, it is important to note that we need a relatively low-speed shutter 70 placed in the path of output beam 60. Before incoming light beam 20 is turned off, shutter 70 must be turned off first. This is because when the incoming light is gone, the light energy stored in beam 46 will discharge, resulting in a second short pulse. In conclusion, the interferometer can be applied to high-speed switching of light from a continuous-wave laser.

When incoming light beam 20 is turned off, since there is no more interference effect, the light energy trapped in beam 46 will be released. In the first cycle, ½ of the stored energy will be released. Then, ¼, ⅛, 1/16, 1/32, . . . , of the energy leaves the loop of beam 46 in the second, third, fourth, fifth cycle, etc. Since the intensity of the light trapped in the loop of beam 46 is 5.81, the intensity of beam 60 can be calculated as follows.

$$I(T) = \frac{1}{2} \times \frac{1}{2} \times 5.81 = 1.45, \quad (14)$$

$$I(2T) = \frac{1}{2} \times \frac{1}{4} \times 5.81 = 0.73, \quad (15)$$

$$I(3T) = \frac{1}{2} \times \frac{1}{8} \times 5.81 = 0.37, \quad (16)$$

and so forth. The values of I(T) to I(10T) are given in Table 3.

TABLE 3

Second pulse intensity as a function of time.

| Time, t | Intensity |
|---|---|
| t < L/c | I(T) = 1.45 |
| L/c ≦ t < 2L/c | I(2T) = 0.73 |
| 2L/c ≦ t < 3L/c | I(3T) = 0.36 |
| 3L/c ≦ t < 4L/c | I(4T) = 0.18 |
| 4L/c ≦ t < 5L/c | I(5T) = 0.09 |
| 5L/c ≦ t < 6L/c | I(6T) = 0.045 |
| 6L/c ≦ t < 7L/c | I(7T) = 0.023 |
| 7L/c ≦ t < 8L/c | I(8T) = 0.011 |
| 8L/c ≦ t < 9L/c | I(9T) = 0.006 |
| 9L/c ≦ t < 10L/c | I(10T) = 0.003 |

It is seen from Table 3 that after ten cycles, the output intensity is about 0.2% of the peak intensity. Thus, the pulse length is about 10 ns and the half-maximum pulse-width is 2 ns if L=30 cm. The pulse length is 1 ns and the half-maximum pulse-width is 200 ps, if L=3 cm.

It is interesting to note that the first pulse and the second pulse have almost identical shapes. The apparent small differences in Tables 2 and 3 are caused by errors in numerical calculation. Certainly, the second pulse can be used together with the first pulse as a pair of pulses. Thus shutter 70 is no longer needed. Alternatively, the second pulse can be used as an independent pulse (for which shutter 70 is required).

Figure 4A:
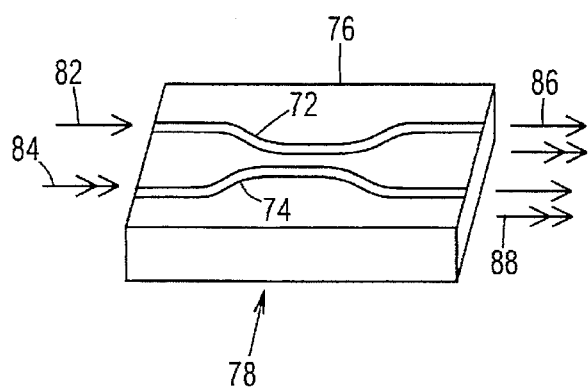
FIGS. 4A and 4B show the similarity between a waveguide coupler and a beam splitter as a beam dividing and combining means.
Figure 4B:
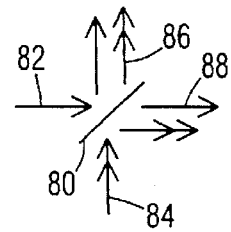

FIGS. 4A and 4B—DESCRIPTION

FIG. 4 shows an integrated-optic waveguide coupler 78 (FIG. 4A) and a beam splitter 80 (FIG. 4B) as a beam dividing and combining means. The similarity between waveguide coupler 78 and beam splitter 80 will become apparent from the ensuing discussion.

An optical waveguide is a light conduit consisting of a strip of dielectric material surrounded by another dielectric material of lower refractive index. The light is transported through the inner medium without radiating into the surrounding medium.

For example, integrated-optic waveguides are fabricated using electro-optic dielectric substrates, preferably $LiNbO_3$ (lithium niobate), with strips of slightly higher refractive index at the locations of the waveguides; preferably titanium-doped $LiNbO_3$, created by diffusing titanium into the substrate $LiNbO_3$.

If two waveguides are sufficiently close, light can be coupled from one into the other. Light can be transferred between the waveguides, an effect that is used to make waveguide couplers.

Waveguide coupler 78 (FIG. 4A) consists of two closely positioned waveguides 72 and 74 on a substrate 76. When input beams 82 and 84 are incident into waveguides 72 and 74, respectively, an output beam 86 from waveguide 72 is a combination of input beams 82 and 84. An output beam 88 from waveguide 74 is another combination of input beams 82 and 84.

Integrated optics has been widely applied in fiber optical communication to process the transmitted and detected optical signals. It is also used in an optical head of an optical disk system to transfer the transmitted and received optical signal. Laser light in the spectrum band of visible, infrared, and ultra violet is able to propagate in integrated-optic waveguides. The main advantage of integrated optics is that a large optical system can be miniaturized in much the same way that integrated circuits have miniaturized electronics.

Coupler 78 has the same function as beam splitter 80, shown schematically in FIG. 4B. Beam splitter 80 also produces output beams 86 and 88 that are combinations of input beams 82 and 84.

FIG. 5—DESCRIPTION

Figure 5:
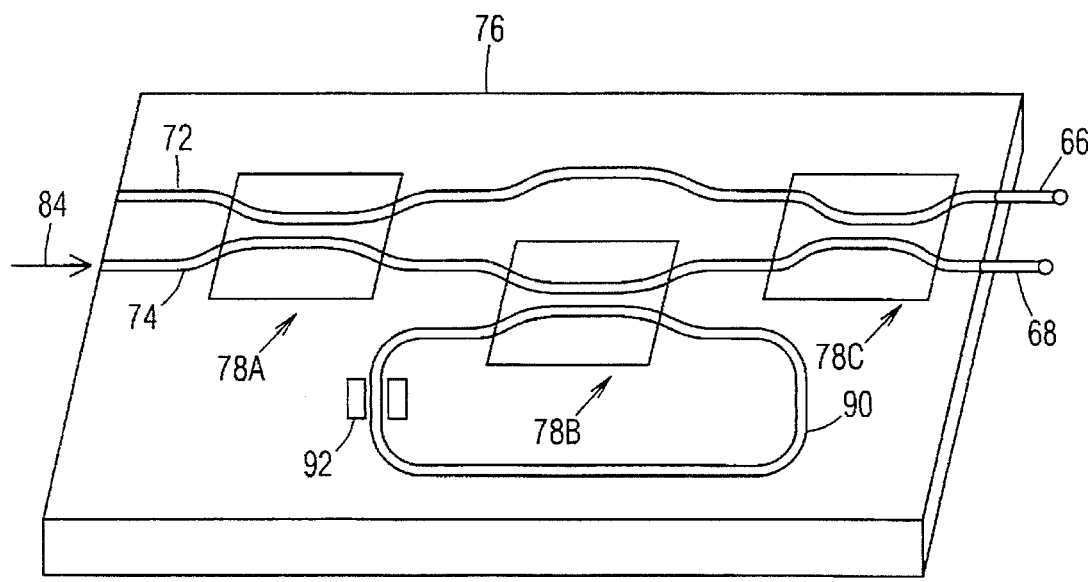
FIG. 5 shows a preferred embodiment of the interferometer employing integrated optics in accordance with the invention.

A preferred embodiment of an interferometer for measuring coherence length is illustrated in FIG. 5, using integrated-optic waveguides.

The interferometer shown in FIG. 5 is a practical realization of the interferometer shown in FIG. 3. Waveguide 72 in FIG. 5 replaces beams 56 and 60 in FIG. 3. Waveguide 74 replaces beams 20, 40, 44, and 62. A looping waveguide 90 replaces looping beam 46. Couplers 78A, 78B, and 78C replace beam splitters 54, 42, and 58. Input beam 84 is equivalent to input beam 20. No mirrors are needed in the interferometer shown in FIG. 5. Similar detectors 66 and 68 are used to detect the intensities of output beams from waveguides 72 and 74. A pair of electrodes 92 is used to tune waveguide 90 to produce constructive interference in waveguide 90.

When an electric potential is applied across electrodes 92, the refractive index of electro-optic waveguide 90 (preferably, titanium-doped $LiNbO_3$) between electrodes 92 varies. The variation of refractive index causes change in optical path accordingly. The small change in optical path is used to tune the waveguide to produce constructive interference.

If the central wavelength of light is known and fixed (e.g., the central wavelength of a Helium-Neon laser is 632.8 nm), waveguide 90 can be fabricated precisely to produce constructive interference without fine tuning. Thus, electrodes 92 are no longer required. And substrate 76 is not necessarily an electro-optic material such as $LiNbO_3$.

The interferometer shown in FIG. 5 is preferred when the coherence length of light to be measured is less than 1 m. Note that coherence lengths of commonly used lasers are less than 1 m. In this case, the length of looping waveguide 90 is less than 10 cm. Thus, all waveguides can be fabricated on a 5.5 cm×8.5 cm (credit card size) substrate.

The main advantage of this embodiment is that the interferometer for measuring the coherence length of laser light can be constructed as a light, rigid, and compact hand-held system.

FIG. 6—DESCRIPTION

Figure 6:
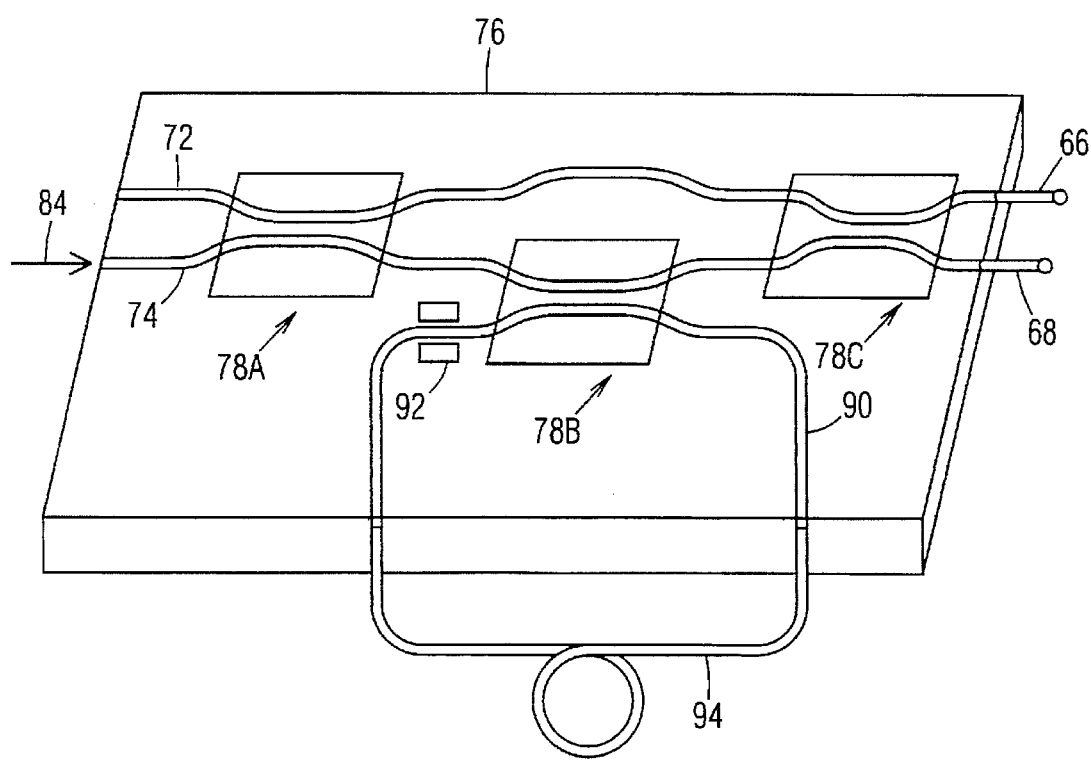
FIG. 6 shows a preferred embodiment of the interferometer employing integrated optics and an optical fiber in accordance with the invention.

If the coherence length of light to be measured is larger than 1 m (for special purpose lasers), the length of looping waveguide 90 must be larger than 10 cm. For this situation, waveguide 90 is preferably connected with an optical fiber 94, as illustrated in FIG. 6.

FIG. 7—DESCRIPTION

Figure 7:
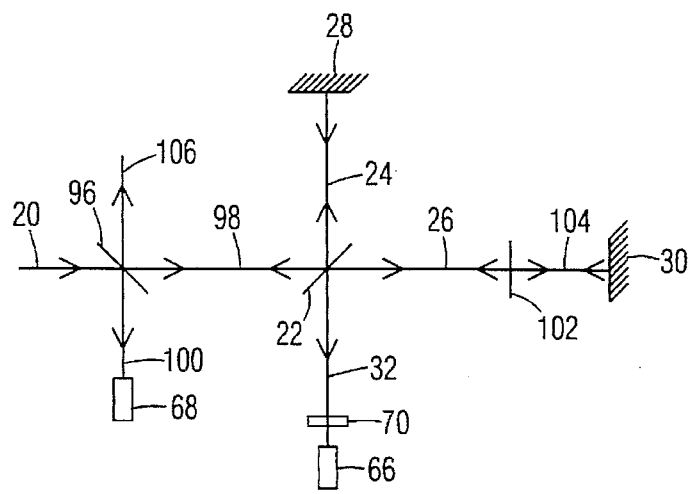
FIG. 7 shows an alternative configuration of the interferometer based on a Michelson interferometer in accordance with the invention.

Alternatively, the interferometer depicted in FIG. 3 that is based on a Mach-Zehnder interferometer can be replaced by an equivalent interferometer depicted schematically in FIG. 7 that is based on a Michelson interferometer. Thus the comparison of the present interferometer with the prior-art Michelson interferometer of FIG. 1A is easy to understand.

In FIG. 7, incoming light beam 20 is divided by beam splitter 96 into beams 98 and 100. The intensity of beam 100 can be detected by detector 68 as a reference of incoming light intensity. Beam 98 is equivalent to beam 20 in FIG. 1A and is divided by beam splitter 22 into beams 24 and 26. Beam 24 is reflected by mirror 28 and then partially reflected as beam 98 and is partially transmitted to create beam 32 by beam splitter 22.

In contrast to FIG. 1A, a half-silvered mirror 102 is placed in front of mirror 30. Thus beam 26 is partially reflected and partially transmitted by half-silvered mirror 102 to create beam 104. Note that beams 26 and 104 are perpendicular to the surface of half-silvered mirror 102.

Beam 104 is reflected back and forth between half-silvered mirror 102 and mirror 30 and is equivalent to beam 46 in FIGS. 2A, 2B, and 3.

Beams 26 and 24 are equivalent to beams 44 and 56 in FIG. 3, and they are combined by beam splitter 22 to create output beams 32 and 98.

Output beam 98 is sent back to the source and is partially reflected by beam splitter 96 to create beam 106. Since the input intensity is detected by detector 68, beam 106 can be left unused. Output beam 32 is thus equivalent to beam 60 in FIG. 3. Similarly, detector 66 is used to detect the intensity of output beam 32 for measuring coherence length. Shutter 70 is placed in the path of beam 32 when it is used to switch laser light.

The optical paths between beam splitter 96 and detector 68, beam splitters 96 and 22, beam splitter 22 and mirror 28, beam splitter 22 and half-silvered mirror 102, and beam splitter 22 and detector 66 or shutter 70 are formed preferably in free space. However, it is possible to form these optical paths using optical fibers (not shown) or waveguides based on integrated optics (not shown).

If length L of the loop is in the neighborhood of 30 cm, the equivalent loop formed by half-silvered mirror 102, beam 104, and mirror 30 is also constructed preferably in free space. It is possible to form this loop using optical fibers.

If length L of the loop is in the neighborhood of 3 cm, the equivalent loop formed by half-silvered mirror 102, beam 104, and mirror 30 preferably is constructed using a pane of glass having two parallel surfaces.

Furthermore, if length L of the loop is less than 1 mm, the equivalent loop preferably is formed using a thin film. The pulse width or duration of the light switch is reduced to the order of pico seconds and femto seconds by using a thin film to form the equivalent loop.

If the wavelength is 632.8 nm (Helium-Neon laser), a thin film with 316.4 nm thickness provides a 1.06 femtosecond switch. Similarly, a 1.06 picosecond switch can be made using a thin film with 316.4 µm thickness.

A method of generating a delay in a light beam using a half-silvered mirror and a mirror is mentioned in U.S. Pat. No. 5,224,200 to Rasmussen et al (1993). Instead of measuring coherence length or switching laser light, the objective of their system was to destroy the coherence of laser light by adding beams with multiple delays. In their system the incident light beam is not normal to the mirrors. The reflected light beams do not coincide; they are parallel but shifted. Thus a lens is needed to focus these parallel beams into a point.

In contrast to the system of this patent, in the Michelson interferometer of the invention, light beams reflected by the half-silvered mirror and the mirror always coincide and no lens is required.

FIG. 8—DESCRIPTION

Figure 8:
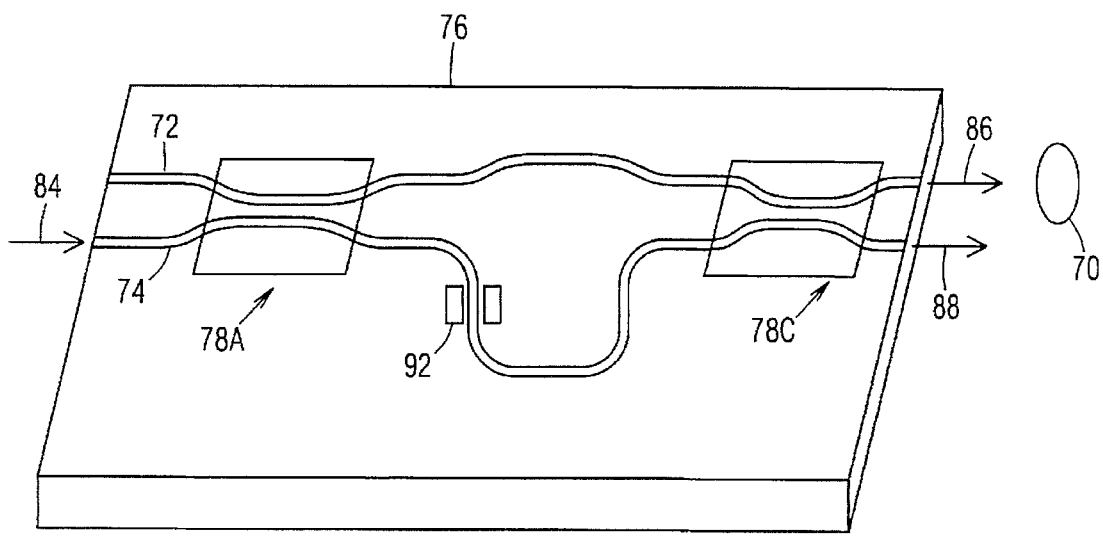
FIG. 8 shows a preferred embodiment of the interferometer with a single delay for switching laser light employing integrated optics in accordance with the invention.

A preferred embodiment of a practical interferometer for switching laser light is illustrated in FIG. 8. The interferometer uses integrated-optic waveguides similar to that in FIG. 5.

It is seen that multiple delays are actually required for measuring the coherence length of light. To function as a switch, the system does not require multiple delays; a single delay is sufficient. For example, a Mach-Zehnder interferometer with a single delay can be used as a switch as shown in FIG. 8.

Similar to FIG. 5, input beam 84 is incident into waveguide 74. After passing through coupler 78A, input beam in waveguide 74 is divided to propagate in waveguides 72 and 74. From coupler 78A to coupler 78C, waveguides 72 and 74 have different length to produce a delay D. Coupler 78C combines light beams in waveguides 72 and 74 into output beams 86 and 88. A pair of electrodes 92 is used to tune waveguide 74 to produce destructive interference in output beam 86. Output beam 86 is equivalent to output beam 60 in FIG. 3. Shutter 70 is placed in the path of output beam 86. The interferometer that uses only one delay will provide a rectangular switching function.

At coupler 78C, the beam in waveguide 74 lags the beam in waveguide 72 by a delay D. The intensity of output beam 86 is half the intensity of beam 84 from time zero, that is the time when the beam in waveguide 72 leaves the interferometer as output beam 86, to time (D/c). (c is the speed of light.)

After time (D/c), the intensity of output beam 86 is zero because destructive interference occurs between beams in waveguides 72 and 74 at coupler 78C. The coherence length of light must be larger than delay D. Similar to FIGS. 3 and 7, an additional shutter 70 is placed in the path of output beam 86 to block the second pulse.

The switching principle disclosed herein can be performed by any interferometer that comprises a beam splitter to divide an incident beam into two beams; the two beams pass unequal optical paths to produce a delay. Then they are combined by the same or another beam splitter to provide destructive interference in one of output beams. Insofar as I am aware, this transient phenomenon in interferometers has never been analyzed and applied to switching of laser light.

An integrated-optic Mach-Zehnder interferometer is a common element in integrated optics. See, for example, "Fundamentals of Photonics," op. cit. pp. 837–838. The integrated-optic Mach-Zehnder interferometer is commonly used as a switch. However, the switching mechanism is entirely based on an electro-optic effect. Thus, an electro-optic substrate such as $LiNbO_3$ is needed, which is usually expensive.

In contrast, the present interferometer utilizes the transient phenomenon caused by a delay in the interferometer. If the central wavelength of the laser light is known (e.g., a Helium-Neon laser emits light at 632.8 nm), electrodes 92 are not required for fine tuning. Thus, an inexpensive substrate such as glass can be employed instead of an expensive electro-optic substrate such as $LiNbO_3$.

The integrated-optic Mach-Zehnder interferometer is commonly formed by two Y junction waveguides. The first Y junction divides a beam from an input waveguide into two beams propagating in two waveguides. The second Y junction combines beams from two waveguides to create a single beam propagating in an output waveguide. One can tune a waveguide before the second Y junction using the electro-optic effect to produce destructive interference in the output beam. So, the output waveguide delivers no energy. Due to energy conservation, the input energy will radiate, leaving waveguides in the Mach-Zehnder interferometer.

If the energy of beam is low, as in applications in optical communication, the radiating energy is negligible. If the energy of beam is high, as in applications in laser surgery, the radiating energy is dangerous to humans and cannot be neglected.

The present interferometer has two output beams 86 and 88. When beam 86 delivers no energy, beam 88 will deliver the total input energy. There is no danger from radiated energy.

Similar to the embodiment illustrated in FIGS. 5 and 6, the main advantage of this embodiment is that the interferometer for switching laser light can be constructed as a light, rigid, and compact hand-held system. Laser light from infrared, visible, to ultra violet can be applied to the switch.

SUMMARY, RAMIFICATIONS, AND SCOPE

Accordingly, the reader will see that the interferometer of this invention can be used for measuring coherence length, switching laser light, and other applications that are based on interference, especially interference with multiple delays. Instead of using moving parts, delay or optical path difference is produced by passing the interfering beam around a loop. The looping beam partially leaves the loop at every cycle. The main advantages of the interferometer are that present devices employ no moving parts that could be expensive and bulky. Also they can be used to measure coherence length of light in real time, and to switch laser light in nanosecond and subnanosecond order without electric or additional optical power.

Although the description above contains many specificities, these should not be construed as limiting the scope of the invention but as merely providing illustrations of some of the presently preferred embodiments and applications of this invention. For example, the applications can be extended to wavelength filtering, converting coherent to incoherent illumination, optical communication, laser surgery, sensor, and other applications that are based on interference effect.

Thus the scope of the invention should be determined by the appended claims and their legal equivalents, rather than by the examples given.

I claim:

1. An interferometer comprising:
   a beam dividing and combining means for dividing an incident beam supplied thereto into two beams, whereby only one of said two beams forms a closed loop and the other one of said two beams leaves said closed loop, and
   an optical path that forms said closed loop by returning said one of said two beams to said beam dividing and combining means so that part of said one of said two beams is combined with said other one of said two beams to leave said closed loop, and part of said one of said two beams is combined with itself in said optical path to cycle around said closed loop, whereby only one beam cycles around said closed loop and one beam leaves said closed loop.

2. The interferometer of claim 1 wherein said beam dividing and combining means is a beam splitter.

3. The interferometer of claim 1 wherein said optical path is formed in free space.

4. The interferometer of claim 1 wherein said beam dividing and combining means is a waveguide coupler.

5. The interferometer of claim 1 wherein said optical path is formed by a waveguide employing integrated optics.

6. An interferometer comprising:
   a first beam dividing and combining means for dividing an incident beam supplied thereto into two beams,
   a second beam dividing and combining means for dividing one of said two beams into two further beams,
   a first optical path that returns one of said two further beams to said second beam dividing and combining means so that part of said one of said two further beams is combined with the other one of said two further beams and leaves said second beam dividing and combining means, and part of said one of said two further beams is combined with itself in said first optical path, a second optical path that carries the other one of said two beams from said first beam dividing and combining means to a third beam dividing and combining means, a third beam dividing and combining means that combines said beam carried by said second optical path and said beam combined by and leaving from said second beam dividing and combining means into two output beams, a third optical path that connects said first and second beam dividing and combining means, a fourth optical path that connects said second and third beam dividing and combining means, two detectors for detecting intensities of said two output beams from said third beam dividing and combining means, and a shutter for blocking one of said two output beams.

7. The interferometer of claim 6 wherein said beam dividing and combining means comprises a plurality of beam splitters.

8. The interferometer of claim 6 wherein said optical paths are formed in free space.

9. The interferometer of claim 6 wherein said beam dividing and combing means comprises a plurality of waveguide couplers.

10. The interferometer of claim 6 wherein said optical paths are formed by a plurality of waveguides employing integrated optics.

11. The interferometer of claim 10, further including a pair of electrodes for fine tuning one of said waveguides.

12. The interferometer of claim 6 wherein said first optical path are partially formed by an optical fiber.

13. The interferometer of claim 12, further including a pair of electrodes for fine tuning said first optical path.

14. An interferometer comprising:
a first beam dividing and combining means for dividing an incident beam supplied thereto into two beams, a first detector for detecting the intensity of one of said two beams, a second beam dividing and combining means for dividing the other one of said two beams into two further beams, a first reflecting means for reflecting one of said two further beams from said second beam dividing and combining means back to said second beam dividing and combining means, a partially reflecting means for partially reflecting and partially transmitting the other one of said two further beams from said second beam dividing and combining means, a second reflecting means for reflecting said beam transmitted through said partially reflecting means back to said partially reflecting means, so that said reflected beam is partially reflected back to said second reflecting means and partially transmitted to said second beam dividing and combining means, said transmitted beam through said partially reflecting means is further combined with said reflected beam from said first reflecting means by said second beam dividing and combining means to form an output beam, a second detector for detecting the intensity of said output beam, and a shutter for blocking said output beam.

15. The interferometer of claim 14 wherein said beam dividing and combining means comprises a plurality of beam splitters.

16. The interferometer of claim 14 wherein said reflecting means comprises a plurality of mirrors, and said partially reflecting means is a half-silvered mirror.

17. The interferometer of claim 14 wherein said partially reflecting means is formed by a pane of glass having two parallel surfaces.

18. The interferometer of claim 14 wherein said partially reflecting means is formed by a thin film.

19. An interferometer for switching laser comprising:
a first beam dividing and combining means for dividing an incident beams supplied thereto into two beams, whereby said two beams never from any closed loop and thus never share the same loop and only a single delay between said two beams is needed for switching laser light, two different optical paths positioned to carry said two beams so that said two optical paths generate said single delay between said two beams, a second beams dividing and combining mean for combining said two beams into two output beams so that one of said output beams produces destructive interference and the other one of said two output beams produces constructive interference, whereby switching is caused by a transient phenomenon in said output beam which produces destructive interference, and a shutter for blocking said output beams which produces destructive interference.

20. The interferometer of claim 19 wherein said beam dividing and combining means comprises a plurality of waveguide couplers.

21. The interferometer of claim 19 wherein said optical paths are formed by a plurality of waveguides employing integrated optics.

22. The interferometer of claims 21, further including a pair of electrodes for fine tuning one of said waveguides.

* * * * *